Patented July 21, 1925.

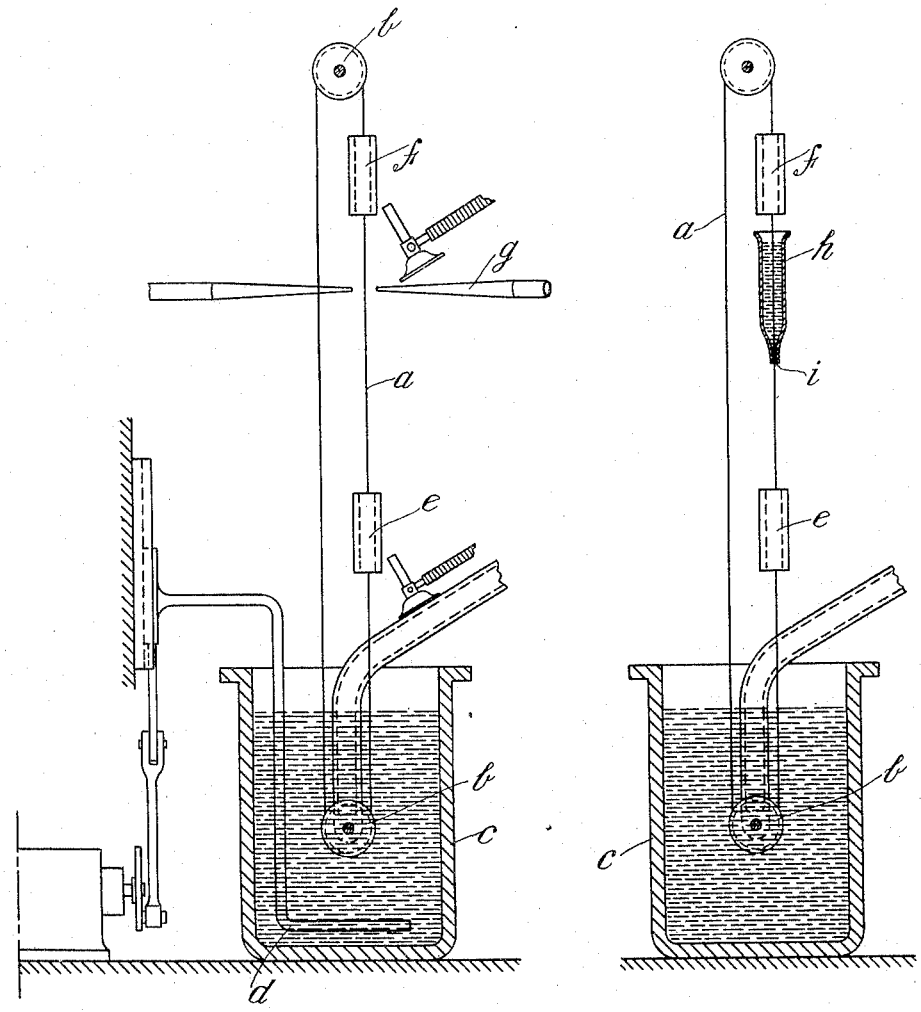
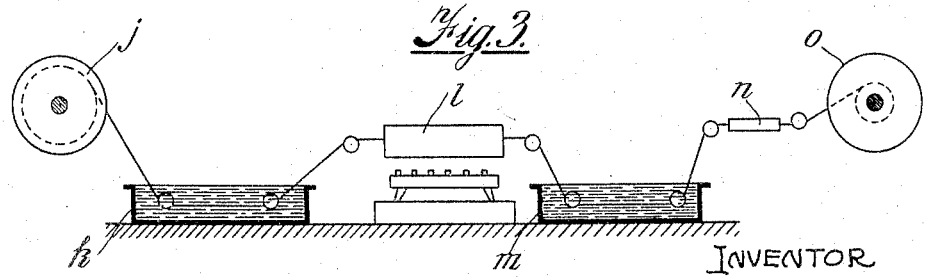

1,546,776

UNITED STATES PATENT OFFICE.

WILLIAM RICHARD BULLIMORE, OF LONDON, ENGLAND.

MANUFACTURE OF FILAMENTS FOR ELECTRIC LAMPS, THERMIONIC TUBES, AND THE LIKE.

Application filed November 24, 1924. Serial No. 752,007.

*To all whom it may concern:*

Be it known that I, WILLIAM RICHARD BULLIMORE, a subject of the King of Great Britain, residing at Aberdeen Lane, Highbury Grove, London N. 5, England, have invented new and useful Improvements in or Relating to the Manufacture of Filaments for Electric Lamps, Thermionic Tubes, and the like, of which the following is a specification, for which I have filed application in Great Britain November 12, 1923.

This invention relates to the manufacture of filaments suitable for electric lamps, thermionic tubes and the like and particularly to the manufacture of filaments in which an emission surface is formed by the application to a base or core of a coating designed to render the completed filament thermionically active at lower temperatures than the metals ordinarily employed in filament manufacture.

It has been found in practice that a number of the substances hitherto employed as coatings tend rapidly to deteriorate or disintegrate by volatilization or other cause such as the heat generated by the passage of an electric current through the filament.

The object of the present invention is to provide improved methods of coating which will overcome inter alia the difficulties referred to above and produce a coating which will retain its original constitution and characteristics favourable to satisfactory emission whilst firmly adhering to the core.

According to this invention improved methods are provided for producing a fine and even coating consisting of inorganic compounds of the alkaline earth metals which is caused to adhere to a metal or carbon core or to a composite metallic core.

In carrying the invention into effect according to one form the base or core is coated with an agglutinant and then passed through a solvent of such a coating in which oxides or salts of the alkaline earth metals are carried in solution or suspension. For example, a preliminary coating of celluloid may be given to the base or core which when coated is passed through a bath of amyl acetate in which the alkaline earth metal compound or compounds is or are in suspension. The final stage consists in burning off the agglutinant by heating the base, which may be effected electrically, leaving the oxide or salt in intimate contact or combination with the base or core.

For the purposes of the invention the oxides of barium, strontium and calcium in the chemically pure state have been found to give satisfactory results and these oxides may be used singly or a mixture of the oxides of barium and strontium may be employed the proportions varying from even quantities of each oxide to two-thirds of the one and one-third of the other.

Reference will now be made to the accompanying drawings which illustrate diagrammatically and by way of example apparatus for carrying the invention into effect and in which:—

Figure 1 is a diagram of an apparatus in which the agglutinant is applied as a jet or jets, Figure 2 is a diagram of an apparatus embodying another method of applying the agglutinant, and Figure 3 is a diagram of a modified form of apparatus for carrying out the process.

Referring first to Figure 1 the metal or carbon filament forming the core to be coated is treated in the form of an endless band $a$ which is progressed by pulleys $b$ driven from a suitable source of power through a bath $c$ provided with an agitating device $d$, through heated tubes $e$ and $f$ and past jets $g$.

The coating process commences at the jets $g$ which impart to the core $a$ a coating of celluloid which is dried by passage through the heated tube $f$. The coated filament then passes downwards into the bath $c$ which contains amyl acetate with the barium or strontium oxide or both in suspension therein and prevented from forming a sediment by the action of the agitating device $d$. By passage through the bath $c$, therefore, the filament receives a coating of the suspended oxide or oxides and it subsequently passes through the tube $e$ which is of silica and is heated to a temperature sufficiently high to drive off the solvent and burn off the celluloid but not to effect injuriously the oxide coating. The filament $a$ is kept moving so that the series of operations above described is repeated until a sufficiently thick coating is obtained.

The apparatus shown in Figure 2 is similar in many respects to that of Figure 1 except that the celluloid is applied to the filament by means of a tube $h$ having a capillary opening $i$ at its base through which the filament enters. The opening $i$ whilst of sufficient diameter to admit the filament freely will not allow the solution to escape downwardly along the filament.

The apparatus shown in Figure 3 is for dealing with larger quantities of filament than those shown in Figures 1 and 2. In this apparatus the filament to be coated is withdrawn from a spool $j$, passed through a bath $k$ containing celluloid in solution, a drying tube $l$ a bath $m$ containing the solvent and oxide or oxides in suspension and a burning off tube $n$ the coated filament being wound onto a spool $o$ and subjected to such further passages through the apparatus described as may be necessary to attain the final thickness of coating desired.

According to a modified form of the process the celluloid may be diluted with amyl acetate to a consistency suitable for retaining the selected alkaline earth metal compound in suspension with or without agitation so that the coating with agglutinant and alkaline earth metal compound may be simultaneously effected.

Although celluloid has been described herein as an agglutinant it is to be understood that the invention is in no way limited to its use, as any substance may be employed capable of adhering to a wire and forming a tacky surface thereon, when the wire thus coated is passed through a liquid having the coating material in suspension or solution therein. Furthermore the invention is not limited to any number of coatings, either of agglutinant or alkaline earth metal compound.

I claim:—

1. The process for manufacturing filaments for thermionic tubes and the like which consists in coating wire with an agglutinant, in passing the wire thus coated through a solvent for the said agglutinant to render the surface thereof tacky and in causing a substance to adhere to such surface and form a coating capable of electron emission when the filament is used as the heated cathode of a thermionic tube.

2. The process for manufacturing filaments for thermionic tubes and the like which consists in coating a base or core with an agglutinant material for the purpose of causing a coating of an inorganic compound or compounds of an alkaline earth metal or metals to adhere to the said core.

3. The process for manufacturing filaments for thermionic tubes and the like which consists in coating a base or core with an agglutinant, in applying a further coating of an inorganic compound or compounds of an alkaline earth metal or metals and in burning off the agglutinant.

4. The process for manufacturing filaments for thermionic tubes and the like which consists in imparting a preliminary coating of agglutinant to a base or core, in passing the core thus coated through a solvent of such coating containing in suspension an alkaline earth metal compound or compounds and in burning off the agglutinant.

5. The process for manufacturing filaments for thermionic tubes and the like which consists in passing a base or core through a liquid containing in suspension an agglutinant and an alkaline earth metal compound or compounds for the purpose of simultaneously effecting a coating of agglutinant and metal compound, the agglutinant being subsequently burnt off.

6. The process for manufacturing filaments for thermionic tubes and the like which consists in imparting to a metal or carbon core a preliminary coating of celluloid in passing the core thus coated through a bath of amyl acetate containing in suspension the selected compound or compounds of an alkaline earth metal or metals and in burning off the celluloid.

In witness whereof I affix my signature.

WILLIAM RICHARD BULLIMORE.